May 8, 1934.  W. ROWE  1,957,732
FLOOR COVERING AND MANUFACTURE THEREOF
Filed Dec. 13, 1930
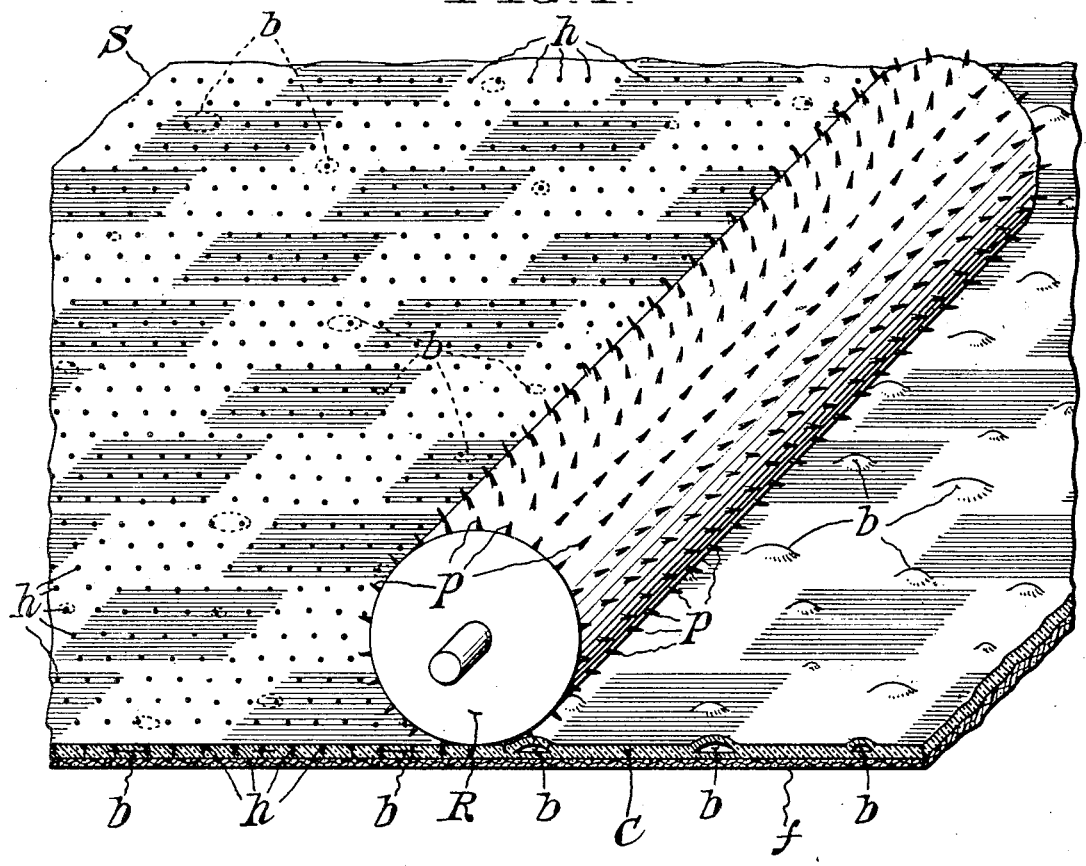
FIG. I.
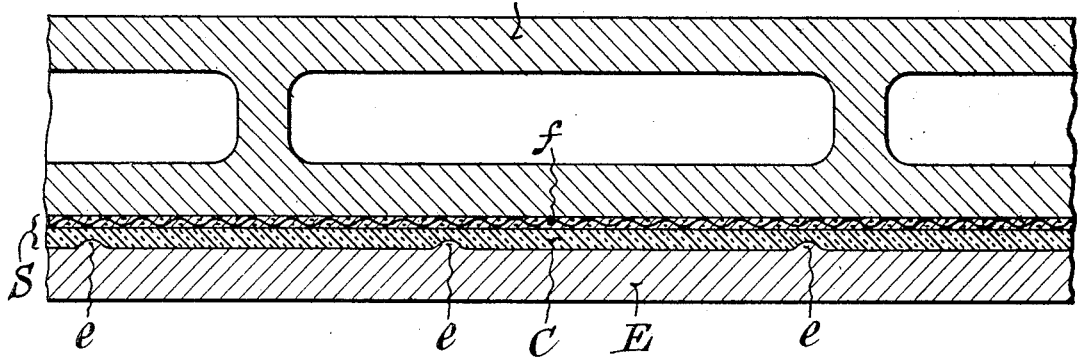
FIG. II.
WITNESSES:
Thomas W. Kerr
Woodrow Stevenson
INVENTOR:
William Rowe,
BY Frawy Paul
ATTORNEYS.

Patented May 8, 1934

1,957,732

UNITED STATES PATENT OFFICE 1,957,732

FLOOR COVERING AND MANUFACTURE THEREOF

William Rowe, Philadelphia, Pa., assignor, by mesne assignments, to Sloane-Blabon Corporation, New York, N. Y., a corporation of Delaware Application December 13, 1930, Serial No. 502,257

6 Claims. (Cl. 154—2)

My invention relates to the manufacture of a novel rubber base floor covering and the like, and is particularly concerned with treatment of the sheet material prior to final vulcanization. It includes a novel product as well as a new process of manufacture. I aim to improve the quality of the product and to shorten the process of manufacture as much as possible, and to avoid trouble and defects from blistering, due to evolution or expansion of gases in the thickness of the material under the heat of manufacture. Such blistering does not occur in the manufacture of linoleum, but does arise in the manufacture of my rubber base product.

In my pending application, Serial No. 492,879, filed November 1, 1930, I have described my novel rubber-base floor covering and its manufacture. My composition is made by combining unvulcanized (or devulcanized) rubber with finely divided fibrous or cellular filler, and a finely divided pigment to give the desired color, together with a vulcanizing agent; one suitable formula being:

| | |
|---|---|
| Rubber (dry basis) | 1 part |
| Wood flour | 3 parts |
| Pigment (including mineral diluent) | 1 part or more |

These materials are thoroughly mixed together, as in a two roll mixer with its rolls steam heated sufficiently to render the mixing easy, and then the vulcanizing agent (and accelerator) is added and thoroughly mixed in. The vulcanizing agent may consist of sulphur in amount equal to 2-6% of the rubber with accelerator ⅓ to 1% of the rubber. All the proportions hereinbefore and hereinafter stated are by weight.

The batch or mixture is then further mixed and disintegrated and reduced to a fine state of division, suggestive of a rather fine sawdust. For this purpose, the mix may be run successively through a water-jacketed German mixer, preferably with holes in its plate about 1 in. to 1¼ in. in diameter; through a "scratcher" with steam-heated rolls; and through a disintegrator of the rotary disc type, known as a "corning machine". The mixing and reducing operations generate a considerable amount of heat, especially in the "German", and any required external heat may be supplied to render the material as plastic and yielding as desired in these operations; but the heat must not be allowed (having regard to duration as well as to temperature) to produce any substantial vulcanization of the rubber, but must, on the contrary, be so controlled as to avoid this. After completion of the mixing and reducing operations, the material may be allowed to cool.

If a multi-colored final product is desired, a corresponding number of batches of the material are made up, each batch properly pigmented to give it one of the desired colors.

The next step is to form the finely divided material into a layer that can be consolidated to a coherent sheet. This may be done by a stencilling operation, using a suitable stencil for each color required in the desired pattern. The layer thus formed is consolidated into a coherent sheet by heat and pressure. If a granulated inlaid product with a fabric backing is desired, the finely divided mixture is stencilled onto a sheet of burlap or other fabric coated with unvulcanized rubber, and then hot-pressed into cohesion and adhesion to the backing, as well as to the desired surface form. Other backings than burlap may, of course, be used, such as paper felt saturated with asphalt, for example. If an unbacked sheet material is desired, as for the manufacture of a "straight line" inlaid product,—as it is termed in the art,—then the mixture is stencilled onto a sheet of oiled paper or the like resting on a flat surface, and is hot-pressed thereon. In either case, the heat employed in pressing need not be sufficient (in temperature and duration) to produce any considerable vulcanization during the pressing operation.

A fabric backing for the material may be prepared as follows:

Burlap with ordinary paint on its rear side is coated on its front side with an unvulcanized rubber preparation. This may be made from scrap rubber or re-claimed rubber, according to the following formula, the proportions being by weight:

| | Parts |
|---|---|
| Scrap rubber | 1 |
| Benzol | 4 |
| Whiting and pigments | quantum sufficit |

The scrap rubber having been dissolved in the benzol, the solution is thickened with whiting and pigments of any desired color to about the consistency of molasses, and is then applied to the unpainted front of the burlap in any suitable manner, as by a gelatine roll, a doctor, or a calendar. This coating is allowed to dry about three quarters dry, till it is just "tacky", when it is ready for the application of the above described finely divided material. This may be done by means of a stencil machine.

In this machine, a layer of finely divided material about ¼ inch deep is stencilled onto the backing, and is pressed down and consolidated into cohesion and adhesion to the backing under a pressure of about 1600 lbs. per sq. in., and a temperature of 212° F., applied for about 30 to 50 seconds. The product is run off from this machine and wound on core rolls (of about 6 in. to 8 in. diameter), in convenient standard lengths of 90 ft., say. These rolls are transferred and the material run through another machine, in which it is again subjected to a pressure of about 1600 lbs. per sq. in., for about 30 to 50 seconds, but at a temperature of about 302° F. In both of these machines, the travel of the material is intermittent: i. e., it moves (say) three feet at a time and then stops for 30 seconds to 1 minute while pressure is applied on a three foot length,—and, at the same time, similar lengths are stencilled. In the second hot-pressing, some vulcanization of the rubber may occur, owing to the high temperature employed.

If this granulated inlaid product is to be embossed, it is now run through an embossing press or through embossing rolls.

After the second pressing (and the embossing), the material is again rolled up, and transferred to the vulcanizing room, where it is unrolled and laid out flat (in lengths of 90 feet) on suitable shelves. Here it is kept at a temperature of from 150 to 165° F. for 3 to 8 days more or less,— about 6 days representing ordinary good practice,—till it is thoroughly vulcanized. At 175° F., a period of twelve hours suffices.

For the manufacture of a straight-line inlaid product, the above-described process is varied as follows:

The finely divided material is stencilled onto a sheet of oiled paper resting on a flat surface, into a layer about ¼ in. deep, and is pressed down and consolidated thereon under a pressure of about 1600 lbs. per sq. in. and a temperature of 212° F. If a pattern or design of plain pieces or blocks is desired, they may be cut from this hot-pressed sheet.

Or if a pattern of variegated pieces or blocks is desired, two or more sheets of proper colors may be cut into strips, which may be mingled together and run through a two or three roll calendar (with rolls at about 150° F.) again and again until the resultant sheet shows satisfactory veining, when the pieces for the desired pattern may be cut from this.

A supply of pieces or "blocks" such as desired having been produced, they are assembled edge to edge in the desired pattern on a fabric backing coated with a "bedding" coat of unvulcanized rubber, as described above. This assemblage is hot-pressed for about ½ min. to 2 min., at a temperature of about 250° F. and a pressure of about 1600 lbs. per sq. in., thus causing adhesion and union of the pieces at their edges and to the backing.

Now in the hot-pressing of the granulated inlaid product, and still more in the hot-pressing of the "straight-line" inlaid product as just described, bubbles of gas form in the thickness of the rubber composition, owing, as it seems, to an initial vulcanization under these conditions. When the sheet is released at the end of the pressing operation, these bubbles swell up and form obvious blisters on the surface of the product,— which are, of course, objectionable.

However, I have found that this blistering trouble can be overcome in the following manner, as illustrated in the accompanying drawing, wherein Fig. I is a perspective view of a sheet of my inlaid product produced as above described, showing two of its edges in section and illustrating a stage in the treatment thereof according to my present invention; and Fig. II is a sectional view of the sheet in a hot-pressing apparatus, illustrating a further stage in the treatment thereof according to my invention.

In the first place, I provide gas outlets in the sheet S (Fig. I), thus venting the blisters $b$ and allowing them to collapse. I have found that it is not necessary to go over the sheet S inch by inch, after pressing, to find and prick each blister $b$ individually; on the contrary, it suffices to prick the sheet with a multitude of fine holes $h$ sufficiently disseminated or distributed to assure a hole for every large blister and to give a hole in close proximity to every blister not actually punctured. This may be done with a pin roller R or a pin platen, having its pins $p$ spaced about ¼ in. on centers in two directions,—or even closer. The pins $p$ are preferably forced clear through the rubber composition $c$ and the fabric backing $f$ as well.

The sheet S being thus vented with gas outlets $h$ (Fig. I), I subject it to a further hot pressing (Fig. II), whereby all air or gas is squeezed out of the blisters $b$ and their walls are pressed together and even reunited. This is effected even in the case of the blisters $b$ that have not been actually punctured, since under the pressure the gas in them bursts its way out, mainly through the closely adjacent vent holes $h$. Under the pressure, also, there may be some re-absorption of gas. Finally, the vent holes are closed and healed up, leaving the finished sheet S unblemished.

If the product is to be embossed (either in correspondence with its color pattern, or without regard to any color pattern,) this may be done coincidently with the repressing after venting, by repressing with an "embossing plate" E, platen, or roller, having suitable ridges or projections $e$ corresponding to the areas which are to be depressed in the sheet.

In any case, the repressing is preferably done at a materially lower temperature than would usually be employed in the pressing that preceded the piercing: i. e., at a heat which (having regard to duration as well as temperature) allows the sheet to be embossed without cracking, and closes and heals the blisters and the vents, and yet is too low to produce appreciable vulcanization and evolution of gas that might reblister the sheet,— or reinflate its old blisters. At a temperature of about 150° F., a pressure of about 150 lbs. per sq. in. for about ½ min. is sufficient. Preferably, the repressing is done with the sheet reversed (Fig. II) as compared with the previous pressing and with ordinary practice: i. e., the plate or platen E in contact with the face of the sheet is unheated, while the plate or platen T at the back of the sheet is heated. Using an ordinary press, the operation is carried out by placing the embossing plate E (if one is used) face up on the unheated movable lower platen of the press and running the sheet S through face down, so that its fabric back $f$ lies against the heated support or top platen T of the press. This results (in view of the brief duration of the operation, and the comparatively low thermal conductivity of the sheet) in the rubber composition being heated only to the minimum degree sufficient for the production of the desired effects as described above, and obviates gas formation. Moreover the slow, low heating defers the closing and sealing of the gas vents as long as possible, thus giving ample opportunity for freeing the sheet of air or gas.

I will now described a further variation of my process, whereby a straight line inlaid product with depressed (and contrasting) lines or areas related to the pattern can be produced without employment of an embossing plate or the like. This is done by placing the "blocks" or pieces of rubber compound on the prepared fabric backing with an interval of, say, 1/8 in. to 1/4 in. between them, instead of in edge to edge contact. Although these gaps or depressed zones are reduced as the blocks are squeezed thinner in the pressing (and repressing) of the sheet, lines of 1/16 to 1/8 in. still remain between the pieces. These lines may be emphasized by using on the fabric backing a thick bedding coat of unvulcanized rubber colored in contrast (e. g., black) with the pattern pieces to be applied thereto. In the pressing and repressing, the bedding coat will squeeze up into the narrowing cracks between the pattern pieces, so as to leave them just deep enough to give a good effect in the final vulcanized product.

It will be understood, of course, that the method or process just described can be employed without the pricking and repressing steps described above, although these steps are desirable, of course, to prevent blistering from the hot-pressing operation whereby the "blocks" are united to the fabric backing.

Having thus described my invention, I claim:

1. A method of treating a sheet of the character described, consisting of a rubber base composition hot-pressed into adhesion to a fabric back; which method comprises pricking the sheet with gas outlets for venting blisters formed in previous hot-pressing of the sheet, and pressing it between an unheated platen at its face and a heated support at its back.

2. A method of treating a sheet of the character described, consisting of a rubber base composition hot-pressed into adhesion to a fabric back; which method comprises pricking the sheet with gas outlets for venting blisters formed in previous hot-pressing of the sheet, and further hot-pressing it under heat sufficient to squeeze out and heal the blisters but too low to produce evolution of gas and reblistering.

3. A method of treating a sheet of the character described, consisting of a rubber base composition hot-pressed into adhesion to a fabric back; which method comprises pricking the sheet with gas outlets for venting blisters formed in previous hot-pressing of the sheet, and further hot-pressing it, at a temperature of about 150° F., between an unheated platen at its face and a heated support at its back.

4. A method for embossing a sheet of the character described, consisting of a rubber base composition hot-pressed into adhesion to a fabric back; which method comprises pricking the sheet with a multitude of disseminated gas outlets for venting blisters formed in previous hot-pressing of the sheet, and acting on the face of the sheet with an unheated embossing device while sustaining or pressing the sheet against said device with a heated support at its back.

5. A method of treating a sheet of the character described, consisting of a rubber base composition hot-pressed into adhesion to a fabric back; which method comprises pricking the sheet with a multitude of disseminated gas outlets for venting blisters formed in the hot-pressing operation, and passing the sheet, back up, through an embossing press, between an unheated subjacent embossing plate and a heated superjacent top platen.

6. A method of treating a line-inlaid sheet of the character described, consisting of pieces of a rubber base composition hot-pressed into union and adhesion edge to edge and to a common fabric back; which method comprises pricking the sheet with a multitude of disseminated gas outlets for venting blisters formed in the hot-pressing operation, and passing the sheet through an embossing press, between an unheated embossing plate at its front and a heated platen at its back.

WILLIAM ROWE.